United States Patent [19]

Fraser, Jr. et al.

[11] 4,210,950

[45] Jul. 1, 1980

[54] HIGH-RATIO-ACCURACY CAPACITOR GEOMETRIES FOR INTEGRATED CIRCUITS

[75] Inventors: Donald L. Fraser, Jr., Warren Township, Somerset County; Michael F. Tompsett, New Providence, both of N.J.

[73] Assignee: Bell Telephone Laboratories, Incorporated, Murray Hill, N.J.

[21] Appl. No.: 947,020

[22] Filed: Sep. 29, 1978

[51] Int. Cl.² ............................................. H01G 4/38
[52] U.S. Cl. ..................................... 361/329; 357/51; 361/303
[58] Field of Search ............... 361/328, 329, 303, 271, 361/306

[56] References Cited

U.S. PATENT DOCUMENTS

| | | | |
|---|---|---|---|
| 2,493,199 | 1/1950 | Khouri | 361/328 X |
| 2,694,185 | 11/1954 | Kodama | 361/329 X |
| 3,273,033 | 9/1966 | Rossmeisl | 361/329 X |
| 3,519,901 | 7/1970 | Bean | 357/59 |
| 3,644,802 | 2/1972 | Dingwall | 357/51 |

FOREIGN PATENT DOCUMENTS 245676  1/1926  United Kingdom .................... 361/329

OTHER PUBLICATIONS

"All MOS Charge Redistribution Analog to Dig. Conversion", pp. 371–379 in Journal of Solid State Circuits, vol. SC10 #6, 12/75.
"Analog Sample Data Filters", pp. 302–304, IEEE Journal Solid State Circuits, vol. SC7 #4, 8/72.

Primary Examiner—E. A. Goldberg
Attorney, Agent, or Firm—Lucian C. Canepa

[57] ABSTRACT

A number of known circuit configurations require high-ratio-accuracy capacitors. Maintaining such ratios during the various processing steps involved in fabricating the configurations in integrated-circuit form has been found to be difficult. In accordance with this invention, ratio capacitors are made in integrated-circuit form utilizing a unique geometry. In one specific embodiment, a so-called H-section geometry that is largely insensitive to processing variations is utilized to form the capacitors. In this way, high-yield low-parasitic precisely matched pairs of ratio capacitors are achieved.

8 Claims, 4 Drawing Figures

HIGH-RATIO-ACCURACY CAPACITOR GEOMETRIES FOR INTEGRATED CIRCUITS

TECHNICAL FIELD

This invention relates to capacitors and, more particularly, to capacitor geometries uniquely suited to be included in microminiature integrated circuits wherein highly accurate capacitance ratios are required.

BACKGROUND OF THE INVENTION

A number of known circuit configurations require high-ratio-accuracy capacitors. Thus, for example, in an article entitled "All-MOS Charge Redistribution Analog-to-Digital Conversion Techniques-Part I," *Journal of Solid-State Circuits*, Volume SC-10, No. 6, pages 371-379, December 1975, the use of a binary-weighted capacitor array to perform high-speed successive approximation conversion is described. As stated on page 373 of the article, "the optimization of the ratio accuracy [of the capacitors] in the array is a prime consideration."

Additionally, high-ratio-accuracy capacitor geometries are required for so-called switched capacitor filter units. (See "Analog Sample-Data Filters," *IEEE Journal of Solid-State Circuits*, Volume SC-7, No. 4, pages 302-304, August 1972, for a description of such units.) In filters of this type, capacitor ratio accuracies of less than ±1% are frequently specified.

Fabrication of matched-ratio capacitors in integrated-circuit form typically involves a processing sequence that includes various etching steps. During such a sequence, deviations from an optimum specified ratio frequently occur. Thus, for example, under- or over-etching during the capacitor fabrication process can cause unacceptable deviations from the specified ratio.

Ratio errors arising from variations in the etching steps utilized to fabricate integrated circuit capacitors can be minimized. As described in the first of the above-cited articles, this can be done, for example, by interconnecting identical discrete capacitor units in parallel (see FIG. 6 on page 374 of the cited article). This interconnected array forms a relatively large capacitance-value unit. In turn, the relatively small capacitance-value unit of a matched pair of ratio capacitors comprises one or more such identical units. In this way, a matched pair of units whose values are related by an integral ratio is provided. The capacitor units of the pair are characterized by respective perimeters and areas which are also each related by the specified ratio. Significantly, the prescribed capacitance ratio of such a pair of units is substantially insensitive to etching variations that occur during the capacitor fabrication process.

The above-described interconnected-array approach of fabricating ratio capacitors in integrated circuit form is characterized by several disadvantages. First, the yield and therefore the cost of such an array suffer from the requirement that for each capacitor unit in the interconnected array a separate pair of microminiature contact windows must be formed. For high-ratio arrays, this obviously becomes a burdensome requirement. Second, especially when a relatively high ratio of capacitance values is specified, the parasitic capacitance of the array tends to become unacceptably large and unpredictable. Third, the interconnected array approach does not lend itself to processing-insensitive fabrication of capacitor units having nonintegral ratios.

In view of the above, continuing efforts have been made to attempt to devise improved ratio-capacitor geometries for implementation in integrated-circuit form. It was recognized that such improved geometries, if available, would improve the cost and performance of the overall circuit configurations of which the capacitors are important constituent elements.

SUMMARY OF THE INVENTION

In accordance with the principles of the present invention, ratio capacitors are made in integrated-circuit form utilizing a unique geometry. In one specific embodiment of the invention, each capacitor of a pair of ratio capacitors includes only two specially configured plates. Thus, only four contact windows need be formed to establish electrical connections to the pair of capacitors. Moreover, relatively large capacitor ratios can be thereby realized with relatively low and predictable parasitic capacitances. Significantly, the geometry of the plates is such that a predesigned capacitance ratio is maintained with high precision despite etching variations that occur during the fabrication process. And this is so even if nonintegral ratios are specified.

More specifically, applicants' invention comprises an integrated circuit that includes a first or relatively small-capacitance-value capacitor unit having two substantially identical spaced-apart plates. The capacitance value of the first unit is designated $C_S$. Each plate of the first unit has an effectivve area $A_S$ and an effective perimeter $P_S$. The circuit further includes a second or relatively large-capacitance-value capacitor unit also having two substantially identical spaced-apart plates. The capacitance value of the second unit is designated $C_L$, where $C_L = kC_S$, k being the specified ratio of capacitance values of the indicated units. Each plate of the second unit has an effective area $A_L$, where $A_L = kA_S$, and an effective perimeter $P_L$. In addition, the aforespecified areas and perimeters of the plates of the capacitors are related by the expression $$\frac{A_S}{P_S} = \frac{A_L}{P_L}.$$

In one specific illustrative embodiment of the principles of the present invention, these relationships are satisfied by utilizing a so-called H-section geometry to form the ratio capacitors.

BRIEF DESCRIPTION OF THE DRAWING

A complete understanding of the present invention and of the above and other features thereof may be gained from a consideration of the following detailed description presented hereinbelow in connection with the accompanying drawing, in which.

DETAILED DESCRIPTION

Figure 1:
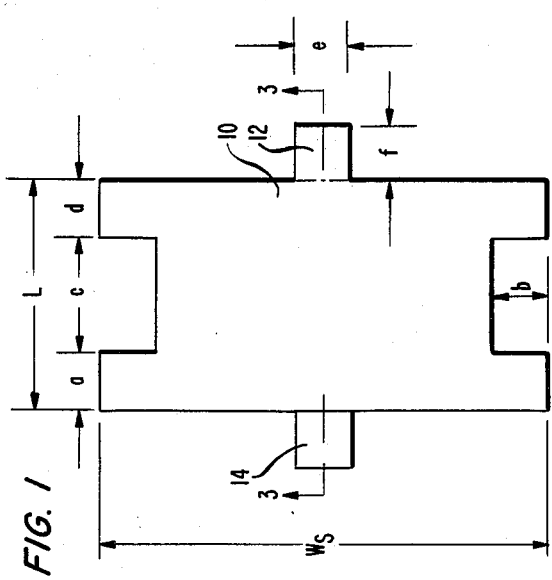
FIG. 1, which is a top view of one plate (and of only a tab portion of the other plate) of the smaller one of two ratio capacitors, shows a specific illustrative plate geometry that embodies the principles of the present invention.

The specific illustrative upper capacitor plate 10 shown in FIG. 1 comprises a generally rectangular configuration with two equal-sized bites respectively removed from the top and bottom thereof. Hereinafter this specific plate, which is configured similar to a capital letter H, will be referred to as having an H-section geometry.

The upper plate 10 of FIG. 1 also comprises a relatively small-area contact tab portion 12 which protrudes from the right-hand part of the depicted upper plate. As will be evident from the description hereinbelow, an electrical connection to the plate 10 is made by contacting the tab portion 12 with a conductive material.

Disposed beneath the upper capacitor plate 10 of FIG. 1 in spaced-apart registry therewith is a lower capacitor plate. Only a contact tab portion 14 of the lower plate is shown in FIG. 1. Illustratively, if the contact tab portions 12 and 14 are ignored, the geometry of the lower plate is substantially identical to that of the upper plate. Accordingly, the lower plate will also be referred to herein as having an H-section geometry.

The capacitance of the specific illustrative unit represented in FIG. 1 is determined essentially only by the overlapping portions of the depicted plates. In other words, the contact tab portions 12 and 14 of the plates do not contribute significantly to the capacitance of the unit. Hence, it is not a matter of major concern if the actual configurations of the portions 12 and 14 vary slightly from a preassigned ideal design. Any such variation that occurs during fabrication will have an insignificant effect on the capacitance value of the integrated circuit embodiment of the unit. Accordingly, hereinafter the areas and perimeters of the contact tab portions will not be included as a part of the overall areas and perimeters of the plates. In determining the overall areas and perimeters of the plates shown in the drawing, it will be assumed in effect that the various depicted tabs have been severed from their respective plates. As so modified, the plates will be referred to herein as having so-called effective areas and perimeters.

Figure 3:
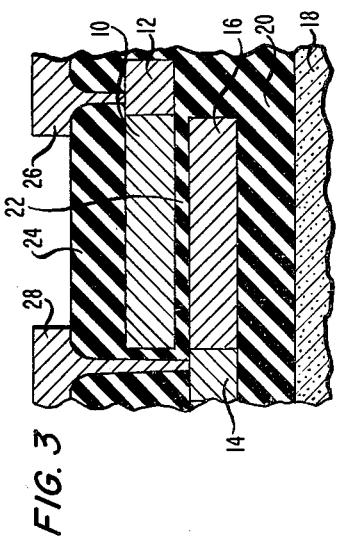
FIG. 3 is a cross-sectional side view of a particular integrated-circuit embodiment of an entire capacitor that includes plates of the type shown in FIG. 1.

The height of the plate 10 depicted in FIG. 1 is $W_S$, the width of the plate is L and the bites removed therefrom each have a height b and a width c. The contact tab portions 12 and 14 each have a height e and a width f. In one particular illustrative embodiment made in integrated-circuit form in accordance with the principles of the present invention, $W_S=40$ micrometers ($\mu$m), L=20 $\mu$m, b=5 $\mu$m, c=10 $\mu$m, a=d=5 $\mu$m and e=f=6 $\mu$m. In that particular embodiment, the plate 10 is advantageously made of a 5,000-Angstrom-unit thick layer of doped polysilicon having a resistivity of about 50 ohms per square. In turn, the plate 10 (which is also shown in FIG. 3) is spaced apart from the substantially identical lower plate 16 (FIG. 3). Illustratively, as indicated in FIG. 3, a layer of silicon dioxide (about 1000 Angstrom units thick) is interposed beween the plates 10 and 16. The capacitance of one illustrative such capacitor unit made in accordance with the principles of this invention measured 0.5 picofarads.

As a practical matter, both plates of a capacitor unit made in accordance with this invention need not be identical. As indicated above, the capacitance of each unit is determined essentially only by the overlapping portions of the plates. Thus, in accordance with one basic aspect of this invention, only one plate of each unit need have an H-section geometry of the unique type specified herein. The other plate of each unit may, for example, have only a simple rectangular configuration that is overlapped by the H-section plate. But, on the other hand, for purposes of modularity in design and fabrication, and/or to reduce parasitic capacitances in the structure, it is often advantageous to make the plates of each unit identical or substantially identical. In practice, it is feasible, for example, to construct a unit in which the upper plate thereof has a prescribed H-section geometry and in which the spaced-apart lower plate also has an H-section geometry but one that is slightly larger in size. Thus, illustratively, in one particular embodiment of such a unit wherein the upper plate has the dimensions specified in the paragraph immediately above, the lower plate of the unit has the following dimensions: $W_S=44$ $\mu$m, L=24 $\mu$m, b=5 $\mu$m, c=6 $\mu$m, a=d=9 $\mu$m. In this particular example, the dimensions of the upper plate are relatively critical and are essentially determinative of the capacitance of the unit. The dimensions of the larger lower plate are not critical. Moreover, registration between two such differently sized plates is not critical, the only requirement being that all of the upper plate overlap portions of the lower plate.

Herein, for purposes of a specific illustrative example in the detailed description, idealized units each having matched identical plates (except for the contact tabs thereof) will be assumed. In practice, in those cases wherein the plates of a unit are not identical, the effective perimeters and areas specified in the relationship set forth below are those of only the critical H-section plate of each unit.

A cross-sectional side view of an entire specific illustrative capacitor unit, including the plates represented in FIG. 1, is shown in FIG. 3. FIG. 3 is a cross-section viewed at the line 3—3 indicated in FIG. 1.

The capacitor unit shown in FIG. 3 includes the aforedescribed plates 10 and 16 including respective contact tab portions 12 and 14. The depicted unit further includes a silicon substrate 18 having a layer 20 of silicon dioxide thereon. In one specific illustrative embodiment, the thickness of the layer 20 between the top of the substrate 18 and the bottom of the lower plate 16 was about 9000 Angstrom units. In that embodiment, the thickness of each of the plates 10 and 16 was about 5000 Angstrom units and the thickness of the silicon dioxide region 22 between the overlapping portion of the plates 10 and 16 was about 1000 Angstrom units, which are the same illustrative values mentioned earlier above. Disposed on top of the upper plate 10 is a layer 24 of silicon dioxide about 8000 Angstrom units thick.

Individual electrical connections to the plates 10 and 16 are also shown in FIG. 3. These connections comprise, for example, conductive regions 26 and 28 deposited in small-area contact windows formed in the silicon dioxide in any one of various standard ways known in the art. These windows are respectively made in aligned registry with the contact tab portions 12 and 14. Accordingly, when a conductive material such as aluminum is deposited on the top surface of the silicon dioxide region 24, portions of the aluminum extend into the windows and establish electrical connections to the respective tab portions of the plates 10 and 16. Subsequently, the aluminum layer deposited on the entire top surface of the unit is patterned in a standard way to form individual spaced-apart conductors. In turn, these conductors are utilized to connect the indicated capacitor unit to other components included in an overall circuit array.

Figure 2:
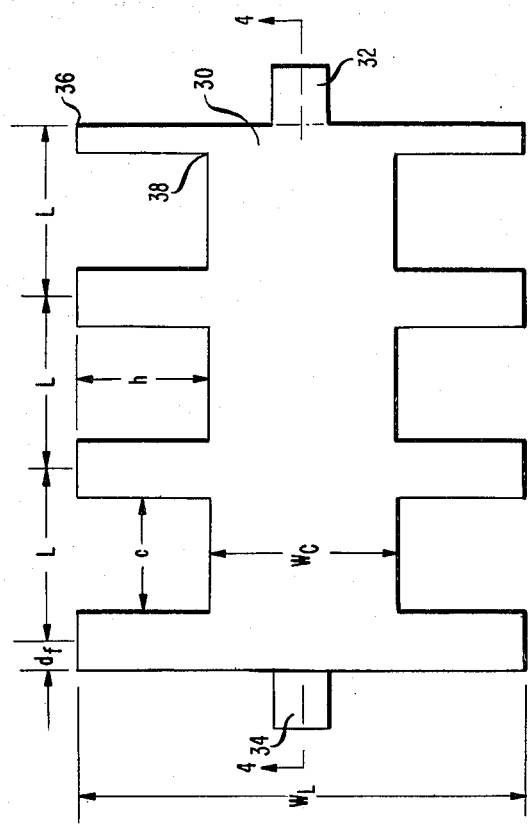
FIG. 2, which is a top view of one plate (and of only a tab portion of the other plate) of the larger one of two ratio capacitors, also shows a specific illustrative plate geometry that embodies the principles of this invention.

A portion of a specific illustrative larger-capacitance-value capacitor unit made in accordance with the principles of the present invention is shown in FIG. 2. The entire upper plate 30, including a contact tab portion 32, and only a contact tab portion 34 of the lower plate of this unit are represented in FIG. 2. The two plates are assumed to be aligned in exact overlapping registry. Again, for the same reasons discussed above in connection with FIG. 1, the tab portions will in effect be disregarded when the areas and perimeters of the plates are considered.

The advantages of the present invention are particularly evident when relatively large nonintegral capacitor ratios are specified. Thus, for example, advantageous matched units having a capacitance ratio of 15:1±0.5% have been built and successfully tested. But, so as not to unduly complicate the drawing, a relatively small-ratio pair of capacitor units is depicted in the figures herein. Thus, the particular illustrative unit represented in FIGS. 2 and 4 is assumed to have a capacitance value 3.1 times that of the unit represented in FIGS. 1 and 3.

In the course of fabricating ratio-capacitor units, it is advantageous to design the units to exhibit a generally modular structure. Thus, for example, fabrication of the larger unit partially shown in FIG. 2 is facilitated by designing the unit to comprise constituent parts each of which conforms in width and general geometry to the corresponding characteristics of the smaller unit partially shown in FIG. 1. Thus, in accordance with an aspect of the principles of the present invention, each of the plates depicted in FIG. 2 comprises, for example, three main H-section parts each L units in width. Further, each such plate includes an additional fractional section having a width $d_f$. The capacitance attributable to the overlapping fractional sections comprises the nonintegral portion of the specified ratio. Thus, for the particular example assumed above, the spaced-apart fractional sections are designed to exhibit a capacitance that is 0.1 times that of the unit partially shown in FIG. 1. Each of the three main parts of FIG. 2 is designed to exhibit a capacitance that is the same as that of the FIG. 1 assembly. Accordingly, overall, the units of FIGS. 1 and 2 are related by a capacitance ratio of 3.1:1. Herein, the specified ratio is designated by the letter k.

Figure 4:
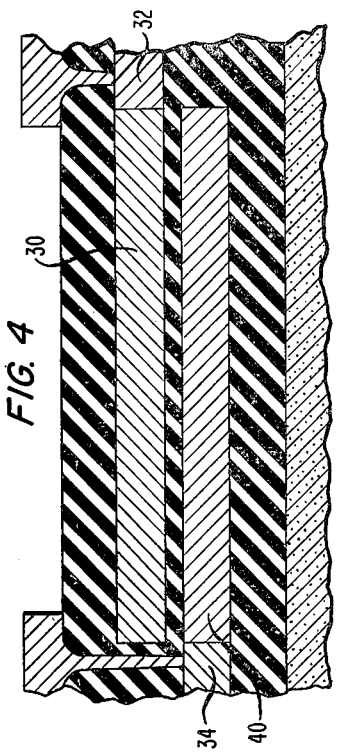
FIG. 4 is a cross-sectional side view of a particular integrated-circuit embodiment of an entire capacitor that includes plates of the type shown in FIG. 2.

An entire illustrative capacitor unit that includes the plates represented in FIG. 2 is shown in FIG. 4. Except for the inclusion therein of larger-area and differently configured plates, the capacitor unit of FIG. 4 is advantageously identical to the unit depicted in FIG. 3 and described earlier above.

To make the indicated capacitor ratio relatively insensitive to etching variations, several design criteria must be embodied in the depicted capacitor structures. First, the effective area $A_L$ of each plate of the larger capacitor unit must be k times the effective area $A_S$ of each plate of the smaller unit (that is, $A_L = kA_S$). Second, the effective perimeters and areas of the plates must be related by the expression $$\frac{A_S}{P_S} = \frac{A_L}{P_L},$$

where $P_S$ is the effective perimeter of each plate of the smaller unit and $P_L$ is the effective perimeter of each plate of the larger unit.

Additionally, it is known that corner rounding effects occur during the fabrication of ratio-capacitor units in integrated circuit form. These effects are typically different in the case of so-called 90-degree and 270-degree corners. (In FIG. 2, reference numeral 36 indicates a typical 90-degree corner and numeral 38 indicates a typical 270-degree corner.) Ideally, the number of each type of corner in the larger-capacitance unit should be m times the corresponding number included in the smaller-capacitance unit, where m is the integer portion of the ratio k.

As is evident from FIGS. 1 and 2, the number of 270-degree corners included in the larger plate 30 is exactly 3 times the number of such corners in the smaller plate 10. The number of 90-degree corners in the larger plate 30 is, however, only twice the number of such corners in the smaller plate 10. This is not ideal, but the relationship between the indicated 90-degree corners approaches m more closely as k increases.

In the particular illustrative capacitor units represented in the drawing, the bites removed from each of the larger plates (such as the plate 30) are each advantageously also c units wide. But, in accordance with the principles of the present invention, each such bite is h units high. The dimension h is selected, in accordance with the systematic procedure set forth below, to ensure that the aforespecified area and perimeter relationships are satisifed.

If the larger-capacitance unit of a pair of ratio capacitors were formed by in effect simply butting together a number of identical FIG. 1-type sections, it is apparent that the area relationship specified earlier above would thereby be satisfied. But, of course, the specified perimeter relationship would not thereby be met. Hence, in accordance with one specific aspect of the principles of the present invention, area is removed from the center portion of each butted-together section and added to the legs of the multiple-section unit. In that way, the specified area ratio of the two capacitor units is preserved while at the same time the perimeter of the larger-capacitance unit is selectively augmented to achieve exactly the specified perimeter ratio. With respect therefore to the basic H geometry of the illustrative smaller-capacitance unit, the larger unit is seen to comprise plural modified H-geometry sections.

The desired aforespecified perimeter relationship between two capacitor units of a ratio pair of the type shown in the drawing can be expressed as follows:

$$n^2[8b^2(2m+l)] + n[8b^2(m-k) + 4bW_S(2m-k+2) + 4bL(m-k)] + [2W_SL(m-k) + 4bW_S(m-k) + 2W_S^2(l-k) + 2A_f] = 0 \quad (1)$$

Where n = number of additional b-high bites removed from each bite region of larger capacitor
$W_S$ = height of smaller capacitor
L = width of smaller capacitor
b = height of bite in smaller capacitor
m = number of complete H sections in larger capacitor
k = total capacitance ratio $A_f$ = area of fractional section of larger capacitor.

Expression (1) above can be rewritten as follows:

$$An^2 + Bn + C = 0 \quad (2)$$

where
$A = 8b^2(2m+l)$
$B = 8b^2(m-k) + 4bW_s(2m-k+2) + 4bL(m-k)$
$C = 2W_sL(m-k) + 4bW_s(m-k) + 2W_s^2(l-k) + 2A_f$.
Therefore, $$n = \frac{-B + \sqrt{B^2 - 4AC}}{2A} \quad (3)$$

Assume a particular illustrative capacitor pair of the specific type shown in the drawing, in which $W_S = 40.02$ μm, $L = 20$ μm, $b = 5.0$ μm, $c = 10$ μm, $m = 3$, $k = 3.1$ and $A_f = 70.04$ μm². Then $A = 1400.0$, $B = 3861.7$, $C = -6826.0$, and $n = 1.224$. Accordingly, since $W_L = W_S + 2nb$, $h = 2nb + b$ and $W_C = W_s - 2(n+l)b$, $W_L = 52.26$ μm, $h = 17.24$ μm, $W_C = 17.78$ μm and $d_f = 1.34$ μm.

For the particular illustrative values set forth above, the area $A_S$ of a plate of the smaller depicted capacitor is 700.35 μm². The area $A_L$ of a plate of the larger depicted capacitor is 2171.09 μm² which is exactly 3.1 times $A_S$. The perimeter $P_S$ of a plate of the smaller capacitor is 140.035 μm, and the perimeter $P_L$ of a plate of the larger capacitor is 434.109 μm. Accordingly, it is evident that the relationship $$\frac{A_S}{P_S} = \frac{A_L}{P_L}$$

is in fact realized in the depicted structures.

Finally, it is to be understood that the abovedescribed arrangements are only illustrative of the principles of the present invention. In accordance with these principles, numerous modifications and alternatives may be devised by those skilled in the art without departing from the spirit and scope of the invention. For example, although particular emphasis herein has been directed to capacitor assemblies that include H-section geometries, it is apparent that alternative geometries that satisfy the above-specified area and perimeter relationships are feasible. In each such alternative case, the larger-capacitance assembly of a ratio pair comprises only two continuous spaced-apart plates.

We claim:

1. In combination in an integrated circuit, at least one pair of capacitor assemblies each pair comprising one large and one small capacitor whose respective capacitance values are designed to bear a specified ratio k (k greater than unity) with respect to each other, the smaller-capacitance assembly including two spaced-apart plates (10, 16) of selected shape, plate separation distance, and dielectric material, at least one of said plates of said small capacitor having an area $A_s$ and a perimeter $P_s$, said combination being CHARACTERIZED IN THAT the larger-capacitance assembly of said ratio pair comprises only two continuous spaced apart plates (30, 40) with plate separation distance and dielectric material identical to the plate separation distance and dielectric material of the smaller capacitance-assembly, at least one of said larger plates having an area $A_L$ and a perimeter $P_L$ and a geometric shape limited only by $A_L = kA_S$ and $$\frac{P_S}{A_S} = \frac{P_L}{A_L}.$$

2. A combination as in claim 1 further CHARACTERIZED IN THAT at least one plate of said smaller-capacitance assembly comprises a single H section.

3. A combination as in claim 2 further CHARACTERIZED IN THAT at least one plate of said larger-capacitance assembly comprises m integrally formed H sections, where m is the integer portion of the specified ratio k, and wherein said one plate of said larger-capacitance assembly further comprises an integrally formed fractional portion of an H section corresponding to any noninteger portion of k.

4. A combination as in claim 3 further CHARACTERIZED IN THAT the geometry of said one H-section plate of said smaller-capacitance assembly is defined by two identical bite regions each b units high and c units wide, and wherein the geometry of said one plate of said larger-capacitance assembly is defined by 2 m identical bite regions each h units high and c units wide, where $h > b$.

5. A combination as in claim 4 further CHARACTERIZED IN THAT each of said assemblies comprises two plates made of polysilicon separated by a layer of silicon dioxide.

6. An integrated circuit comprising
a first capacitor having two spaced apart plates of selected shape, plate separation distance, and dielectric material, said first capacitor having a capacitance value $C_S$, at least one of said plates having
an area $A_S$,
and a perimeter $P_S$,
and a second capacitor having only two continuous spaced-apart plates with plate separation distance and dielectric material identical to the plate separation distance and dielectric material of the first capacitor, said second capacitor having a capacitance value $C_L = kC_S$ where k(k greater than unity) is the ratio of said second capacitance to the first capacitance, at least one of said plates of said second capacitor having
an area $A_L$,
and a perimeter $P_L$,
and wherein the aforementioned areas and perimeters of said plates are related by the expressions $A_L = kA_S$ and $$\frac{A_S}{P_S} = \frac{A_L}{P_L}.$$

7. A circuit as in claim 6 wherein said one plate of said first capacitor includes a number of 270-degree corners, and wherein said one plate of said second capacitor includes m times the number of 270-degree corners of said one plate of said first capacitor.

8. An integrated circuit comprising
a first capacitor having two spaced apart plates of selected shape, plate separation distance, and dielectric material, said first capacitor having a capacitance value $C_S$, the overlapping portions of said plates having
an area $A_S$,
and a perimeter $P_S$, and a second capacitor having only two continuous spaced apart plates with plate separation distance and dielectric material identical to the plate separation distance and dielectric material of the first capacitor, said second capacitor having a capacitance value $C_L = kC_s$ where k(k greater than unity) is the ratio of said second capacitance to the first capacitance, the overlapping portions of said plates of said second capacitor having an area $A_L$, and a perimeter $P_L$, and wherein the aforementioned areas and perimeters of said plates are related by the expressions $A_L = kA_S$ and $$\frac{A_S}{P_S} = \frac{A_L}{P_L}.$$

* * * * *